US010762658B2

(12) United States Patent
Wu

(10) Patent No.: US 10,762,658 B2
(45) Date of Patent: Sep. 1, 2020

(54) METHOD AND IMAGE PICK-UP APPARATUS FOR CALCULATING COORDINATES OF OBJECT BEING CAPTURED USING FISHEYE IMAGES

(71) Applicant: ALTEK CORPORATION, Hsinchu (TW)

(72) Inventor: Po-Cheng Wu, New Taipei (TW)

(73) Assignee: ALTEK CORPORATION, Hsinchu (TW)

( * ) Notice: Subject to any disclaimer, the term of this patent is extended or adjusted under 35 U.S.C. 154(b) by 55 days.

(21) Appl. No.: 16/164,810

(22) Filed: Oct. 19, 2018

(65) Prior Publication Data

US 2019/0122379 A1   Apr. 25, 2019

(30) Foreign Application Priority Data

Oct. 24, 2017  (TW) .............................. 106136425 A
Jan. 10, 2018  (TW) .............................. 107100884 A

(51) Int. Cl.
*G06T 7/62* (2017.01)
*H04N 5/225* (2006.01)
*G06T 7/593* (2017.01)

(52) U.S. Cl.
CPC ................ *G06T 7/62* (2017.01); *G06T 7/593* (2017.01); *H04N 5/2258* (2013.01); *G06T 2207/10012* (2013.01); *G06T 2207/10024* (2013.01)

(58) Field of Classification Search
CPC . G06T 2207/10012; G06T 2207/10024; G06T 7/593; G06T 7/62; H04N 5/2258
See application file for complete search history.

(56) References Cited

U.S. PATENT DOCUMENTS 6,005,611 A * 12/1999 Gullichsen ............ G06T 3/0018
                                                    348/143
9,436,973 B2 * 9/2016 Aoki ....................... G06T 5/006
(Continued)

FOREIGN PATENT DOCUMENTS

CN    103247024    8/2013
CN    104240236    12/2014
(Continued)

OTHER PUBLICATIONS

"Office Action of Taiwan Counterpart Application", dated Mar. 18, 2019, p. 1-p. 11.

*Primary Examiner* — Peter D Le
(74) *Attorney, Agent, or Firm* — JCIPRNET

(57) ABSTRACT

A method and an image pick-up apparatus for calculating coordinates of an object being captured by using fisheye images are provided. In the method, a first and a second fisheye image containing the object are respectively captured by using a first and a second fisheye lens. Coordinates of the object in the first and the second fisheye image are detected. A first and a second azimuth angle of the object relative to fisheye centers of the first and the second fisheye image on an image sensor plane are accordingly calculated. Distances between the coordinates of the object and the fisheye centers are respectively transformed into a first and a second incident angle through lens curves of the fisheye lenses. Three-dimensional coordinates of the object are calculated according to the first and the second azimuth angle, the first and the second incident angle, and a baseline distance between the fisheye lenses.

16 Claims, 8 Drawing Sheets

(56) References Cited

U.S. PATENT DOCUMENTS

| | | | | |
|---|---|---|---|---|
| 9,532,031 B1* | 12/2016 | Bendall | | H04N 13/239 |
| 10,027,883 B1* | 7/2018 | Kuo | | G06K 9/00295 |
| 10,063,838 B2* | 8/2018 | Segawa | | G06T 1/20 |
| 10,325,339 B2* | 6/2019 | Lee | | B60R 11/04 |
| 10,388,027 B2* | 8/2019 | Tanaka | | G06F 3/011 |
| 10,397,524 B1* | 8/2019 | Wu | | B60R 1/00 |
| 10,469,829 B2* | 11/2019 | Ohba | | H04N 13/128 |
| 10,551,930 B2* | 2/2020 | Wilson | | A63F 13/428 |
| 10,552,971 B2* | 2/2020 | Gu | | G01B 11/02 |
| 10,554,945 B2* | 2/2020 | Oshima | | H04N 13/243 |
| 2001/0002936 A1* | 6/2001 | Tsuji | | G06K 9/6203 |
| | | | | 382/170 |
| 2001/0014171 A1* | 8/2001 | Iijima | | G06T 7/55 |
| | | | | 382/154 |
| 2002/0025154 A1* | 2/2002 | Nonaka | | G02B 7/32 |
| | | | | 396/106 |
| 2004/0167671 A1* | 8/2004 | Aoyama | | B25J 19/023 |
| | | | | 700/259 |
| 2004/0233280 A1* | 11/2004 | Aoyama | | G06T 5/006 |
| | | | | 348/135 |
| 2004/0234122 A1* | 11/2004 | Kochi | | G01B 11/24 |
| | | | | 382/154 |
| 2006/0139619 A1* | 6/2006 | Fujii | | G01B 11/02 |
| | | | | 356/4.03 |
| 2006/0165276 A1* | 7/2006 | Hong | | G05D 1/0253 |
| | | | | 382/153 |
| 2007/0263924 A1* | 11/2007 | Kochi | | G01C 11/06 |
| | | | | 382/154 |
| 2009/0167886 A1* | 7/2009 | Tonomura | | G06T 3/0031 |
| | | | | 348/222.1 |
| 2010/0040279 A1* | 2/2010 | Yoon | | G05D 1/0251 |
| | | | | 382/153 |
| 2010/0150455 A1* | 6/2010 | Oyama | | G01C 3/085 |
| | | | | 382/219 |
| 2011/0096319 A1* | 4/2011 | Otani | | G01C 3/00 |
| | | | | 356/3.14 |
| 2011/0102549 A1* | 5/2011 | Takahashi | | A61C 1/084 |
| | | | | 348/46 |
| 2011/0279653 A1* | 11/2011 | Hoshino | | G03B 35/02 |
| | | | | 348/47 |
| 2012/0154670 A1* | 6/2012 | Hamamura | | H04N 5/23212 |
| | | | | 348/353 |
| 2013/0135439 A1* | 5/2013 | Kakuko | | H04N 13/00 |
| | | | | 348/46 |
| 2013/0210563 A1* | 8/2013 | Hollinger | | H04N 5/2252 |
| | | | | 473/570 |
| 2014/0376780 A1* | 12/2014 | Ueda | | G06T 7/73 |
| | | | | 382/106 |
| 2015/0077520 A1* | 3/2015 | Ohba | | A63F 13/213 |
| | | | | 348/47 |
| 2015/0304612 A1* | 10/2015 | Richards | | H04N 5/33 |
| | | | | 348/159 |

FOREIGN PATENT DOCUMENTS

| | | |
|---|---|---|
| CN | 104268867 | 1/2015 |
| CN | 103839227 | 6/2017 |
| TW | 594453 | 6/2004 |
| TW | 200528945 | 9/2005 |
| TW | I356186 | 1/2012 |
| TW | 201220828 | 5/2012 |
| TW | 201239807 | 10/2012 |
| TW | I441514 | 6/2014 |
| TW | I558208 | 11/2016 |

* cited by examiner

METHOD AND IMAGE PICK-UP APPARATUS FOR CALCULATING COORDINATES OF OBJECT BEING CAPTURED USING FISHEYE IMAGES

CROSS-REFERENCE TO RELATED APPLICATION

This application claims the priority benefits of Taiwan application serial no. 106136425, filed on Oct. 24, 2017, and Taiwan application serial no. 107100884, filed on Jan. 10, 2018. The entirety of each of the above-mentioned patent applications is hereby incorporated by reference herein and made a part of specification.

BACKGROUND OF THE INVENTION

1. Field of the Invention

The invention relates to an apparatus and a method for image pick-up. More particularly, the invention relates to a method and an image pick-up apparatus for calculating coordinates of an object being captured by using fisheye images.

2. Description of Related Art

Game consoles are one of the indispensable electronic products for home entertainment nowadays. In the control modes of the game consoles, elements used for motion sensing are now added to most of the game consoles to replace the conventional handles, so as to bring greater interaction between the players and the game content. A user's movement or action in space is detected by a sensor such as an infrared sensor to control the game content, and entertainment of the game is thus considerably enhanced.

In addition to the conventional infrared sensor positioning technology, the light bulb detection technology is introduced to the game consoles recently. When the user holds and waves the light bulb joystick in the space, images of the light bulb are captured by the dual lenses disposed on the game console, and the position of the light bulb in the space is thus calculated according to the positions of the light bulb in the images.

Nevertheless, the conventional lenses have limited field of view (FOV), the capturing range of the dual lenses is thus limited, and the moving space of the user is limited as a result. The fisheye lenses with greater field of view may be used to replace the conventional lenses. Nevertheless, images picked up by the fisheye lenses are deformed, and fisheye calibration is thereby required before positioning. Geometry transformation is required during calibration, which may lead to decrease in pipeline duration of the video images, and the frame rates may thus need to be increased to solve such problem.

SUMMARY OF THE INVENTION

The invention provides a method and an image pick-up apparatus for calculating coordinates of an object being captured by using fisheye images, in which three-dimensional coordinates of the object in a space are calculated by using the fisheye images without performing geometry transformation.

In an embodiment of the invention, a method for calculating coordinates of an object being captured by using fisheye images is adapted for an image pick-up apparatus having a first fisheye lens and a second fisheye lens. A baseline distance is provided between the first fisheye lens and the second fisheye lens. In the method, a first fisheye image and a second fisheye image containing an object respectively are captured by using the first fisheye lens and the second fisheye lens. Next, first coordinates of the object in the first fisheye image and second coordinates of the object in the second fisheye image are detected. A first azimuth angle and a second azimuth angle of the object relative to fisheye centers of the first fisheye image and the second fisheye image on an image sensor plane of the first fisheye lens and the second fisheye lens are then calculated according to the first coordinates and the second coordinates. A first distance between the first coordinates and the fisheye center of the first fisheye image and a second distance between the second coordinates and the fisheye center of the second fisheye image are transformed into a first incident angle and a second incident angle respectively through lens curves of the first fisheye lens and the second fisheye lens. Finally, three-dimensional coordinates of the object are calculated by using a trigonometric function according to the first azimuth angle, the second azimuth angle, the first incident angle, the second incident angle, and the baseline distance.

In an embodiment of the invention, the object includes a light-emitting device. The step of detecting the first coordinates of the object in the first fisheye image and the second coordinates of the object in the second fisheye image includes detecting a plurality of pixels having a brightness or a color component greater than a predetermined value in each of the first fisheye image and the second fisheye image. Coordinates of centers or centroids of regions formed by the pixels in the first fisheye image and in the second fisheye image act as the first coordinates and the second coordinates.

In an embodiment of the invention, an incident angle of light emitted by the object on the first fisheye lens is proportional to a projection radius of the light projected on an image sensor of the first fisheye lens, and an incident angle of light emitted by the object on the second fisheye lens is proportional to a projection radius of the light projected on an image sensor of the second fisheye lens.

In an embodiment of the invention, the first azimuth angle is $\varphi_l$, the second azimuth angle is $\varphi_r$, the first incident angle is $\theta_l$, the second incident angle is $\theta_r$, the baseline distance is B, and the three-dimensional coordinates of the object are (x, y, z), wherein $$x = \frac{B \sin \varphi_l \cos \varphi_r}{\sin(\varphi_l + \varphi_r)};$$

$$y = \frac{B \sin \varphi_l \sin \varphi_r}{\sin(\varphi_l + \varphi_r)}; \text{ and}$$

$$z = \frac{B \cos \theta_l \sin \varphi_r}{\sin \theta_l \sin(\varphi_l + \varphi_r)} \text{ or } z = \frac{B \cos \theta_r \sin \varphi_l}{\sin \theta_r \sin(\varphi_l + \varphi_r)}.$$

In an embodiment of the invention, an included angle is provided between an optical axis of the first fisheye lens and an optical axis of the second fisheye lens and that a field of view of the first fisheye lens and a field of view of the second fisheye lens include an overlapping region and a non-overlapping region. The three-dimensional coordinates of the object are calculated by using the trigonometric function according to the first azimuth angle, the second azimuth angle, the first incident angle, the second incident angle, and the baseline distance when the object appears in the overlapping region; and two-dimensional coordinates of the object are calculated by using the trigonometric function according to the first azimuth angle, the second azimuth angle, the first incident angle, the second incident angle, and the baseline distance when the object appears in the non-overlapping region.

An image pick-up apparatus of an embodiment of the invention includes a first fisheye lens, a second fisheye lens, a storage device, and a processor. A baseline distance is provided between the first fisheye lens and the second fisheye lens. The storage device is configured for storing a plurality of modules. The processor is coupled to the first fisheye lens, the second fisheye lens, and the storage device and is configured for accessing and executing the modules stored in the storage device. The modules include an image capturing module, an object detection module, an azimuth angle calculation module, an incident angle calculation module, and a coordinate calculation module. The image pick-up module captures a first fisheye image and a second fisheye image containing an object respectively by using the first fisheye lens and the second fisheye lens. The object detection module detects first coordinates and second coordinates of the object in the first fisheye image and the second fisheye image. The azimuth angle calculation module calculates a first azimuth angle and a second azimuth angle of the object relative to fisheye centers of the first fisheye image and the second fisheye image on an image sensor plane of the first fisheye lens and the second fisheye lens according to the first coordinates and the second coordinates. The azimuth calculation module transforms a first distance between the first coordinates and the fisheye center of the first fisheye image and a second distance between the second coordinates and the fisheye center of the second fisheye image into a first incident angle and a second incident angle respectively through lens curves of the first fisheye lens and the second fisheye lens. The coordinate calculation module calculates three-dimensional coordinates of the object by using a trigonometric function according to the first azimuth angle, the second azimuth angle, the first incident angle, the second incident angle, and the baseline distance.

In an embodiment of the invention, the object includes a light-emitting device, and the object detection module includes a plurality of pixels having a brightness or a color component greater than a predetermined value in each of the first fisheye image and the second fisheye image, and coordinates of centers or centroids of regions formed by the pixels in the first fisheye image and in the second fisheye image act as the first coordinates and the second coordinates.

In an embodiment of the invention, an incident angle of light emitted by the object on the first fisheye lens is proportional to a projection radius of the light projected on an image sensor of the first fisheye lens, and an incident angle of light emitted by the object on the second fisheye lens is proportional to a projection radius of the light projected on an image sensor of the second fisheye lens.

In an embodiment of the invention, the first azimuth angle is $\varphi_l$, the second azimuth angle is $\varphi_r$, the first incident angle is $\theta_l$, the second incident angle is $\theta_r$, the baseline distance is B, and the three-dimensional coordinates of the object are (x, y, z), wherein $$x = \frac{B \sin \varphi_l \cos \varphi_r}{\sin(\varphi_l + \varphi_r)};$$

$$y = \frac{B \sin \varphi_l \sin \varphi_r}{\sin(\varphi_l + \varphi_r)}; \text{ and}$$

$$z = \frac{B \cos \theta_l \sin \varphi_r}{\sin \theta_l \sin(\varphi_l + \varphi_r)} \text{ or } z = \frac{B \cos \theta_r \sin \varphi_l}{\sin \theta_r \sin(\varphi_l + \varphi_r)}.$$

In an embodiment of the invention, an included angle is provided between an optical axis of the first fisheye lens and an optical axis of the second fisheye lens and that a field of view of the first fisheye lens and a field of view of the second fisheye lens include an overlapping region and a non-overlapping region. The coordinate calculation module calculates the three-dimensional coordinates of the object by using the trigonometric function according to the first azimuth angle, the second azimuth angle, the first incident angle, the second incident angle, and the baseline distance when the object appears in the overlapping region; and the coordinate calculation module calculates two-dimensional coordinates of the object by using the trigonometric function according to the first azimuth angle, the second azimuth angle, the first incident angle, the second incident angle, and the baseline distance when the object appears in the non-overlapping region.

In an embodiment of the invention, a method for calculating coordinates of an object being captured by using fisheye images is adapted for an image pick-up apparatus having a fisheye lens. In the method, a fisheye image containing an object is captured by using the fisheye lens. Next, coordinates of the object in the fisheye image are calculated. An azimuth angle of the object relative to a fisheye center of the fisheye image on an image sensor plane of the fisheye lens in calculated according to the coordinates. A distance between the coordinates and the fisheye center of the fisheye image is transformed into an incident angle through a lens curve of the fisheye lens. A distance between the object and the fisheye lens is calculated according to a width of the object in the fisheye image in a direction facing the fisheye center. Finally, the three-dimensional coordinates of the object are calculated by using a trigonometric function according to the azimuth angle, the incident angle, and the distance.

In an embodiment of the invention, the object includes a light-emitting device. The step of detecting coordinates of the object in a fisheye image includes detecting a plurality of pixels having a brightness or a color component greater than a predetermined value in the fisheye image. Coordinates of a center or a centroid of a region formed by the pixels in the fisheye image act as the coordinates.

An image pick-up apparatus of an embodiment of the invention includes a fisheye lens, a storage device, and a processor. The storage device is configured for storing a plurality of modules. The processor is coupled to the fisheye lens and the storage device and is configured for accessing and executing the modules stored in the storage device. The modules include an image capturing module, an object detection module, an azimuth angle calculation module, an incident angle calculation module, a distance calculation module, and a coordinate calculation module. The image pick-up module captures a fisheye image containing an object by using the fisheye lens. The object detection module detects coordinates of the object in the fisheye image. The azimuth angle calculation module calculates an azimuth angle of the object relative to a fisheye center of the fisheye image on an image sensor plane of the fisheye lens according to the coordinates. The incident angle calculation module transforms a distance between the coordinates and the fisheye center of the fisheye image into an incident angle through a lens curve of the fisheye lens. The distance calculation module calculates a distance between the object and the fisheye lens according to a width of the object in the fisheye image in a direction facing the fisheye center. The coordinate calculation module calculates three-dimensional coordinates of the object by using a trigonometric function according to the azimuth angle, the incident angle, and the distance.

In an embodiment of the invention, the object includes a light-emitting device. The object detection module detects a plurality of pixels having a brightness or a color component greater than a predetermined value in the fisheye image. Coordinates of a center or a centroid of a region formed by the pixels in the fisheye image act as the coordinates.

In an embodiment of the invention, the incident angle of light emitted by the object on the fisheye lens is proportional to a projection radius of the light projected on an image sensor of the fisheye lens.

In an embodiment of the invention, it is assumed that a width of the object in the fisheye image is $w_T$, an actual width of the object is $W_T$, an image width of the fisheye image is $W_I$, and a field of view (FOV) of the fisheye lens is F, and a distance r between the object and the fisheye lens is:

$$r = \frac{W_T}{w_T} \times \frac{W_I}{F} \times \frac{180}{\pi}.$$

In an embodiment of the invention, the azimuth angle is φ, the incident angle is θ, the distance is r, and the three-dimensional coordinates of the object are (x, y, z), wherein $x=r \cos θ \cos φ$;

$y=r \cos θ \sin φ$; and $z=r \sin θ$.

To sum up, in the method and the image pick-up apparatus for calculating the coordinates of the object being captured by using the fisheye images provided by the embodiments of the invention, the image of the object is captured by using the fisheye lenses, and the coordinates of the object in the fisheye images are directly used to calculate the incident angles of the light emitted by the object on the fisheye lenses and the azimuth angles of the light emitted by the object on the lens plane without performing geometry transformation, and finally the three-dimensional coordinates of the object in the space are calculated by using a triangle positioning method.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
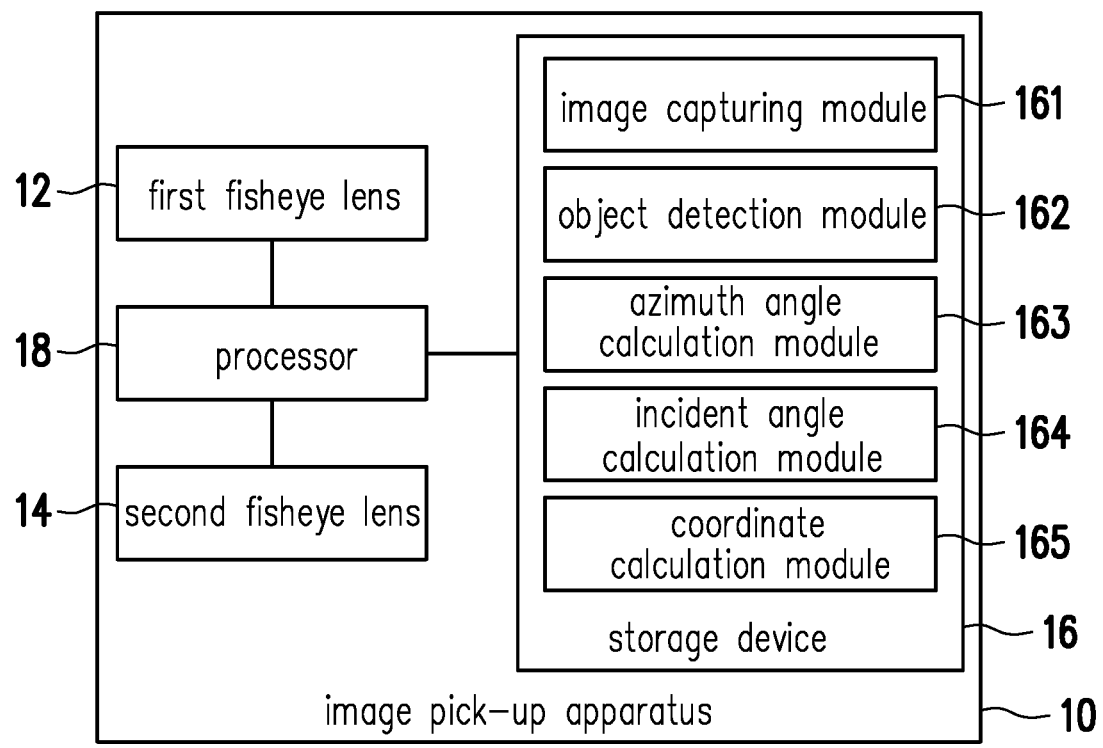
FIG. 1 illustrates a block view of an image pick-up apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Since an equi-distance lens is used for a fisheye lens, an incident angle of light received from an object (e.g., a light bulb) by the fisheye lens is approximately linear with a projection radius of the light projected on an image sensor. Accordingly, in the embodiments of the invention, a position of the object in a fisheye image is detected, an incident angle of the light emitted by the object is inversely derived through the foregoing relationship, and three-dimensional coordinates of the object in a space may thus be calculated by using the incident angle combining with an azimuth angle of the object on a lens plane through a triangle positioning method. In another aspect, in the embodiments of the invention, a distance between the object and the fisheye lens is further calculated according to a width of the object in the fisheye image. Finally, the three-dimensional coordinates of the object in the space are calculated by using a trigonometric function according to the distance, the incident angle, and the azimuth angle calculated. In this way, in the embodiments of the invention, the three-dimensional coordinates of the object being captured may be calculated while increasing a field of view of image capturing without performing geometry transformation.

FIG. 1 illustrates a block view of an image pick-up apparatus according to an embodiment of the invention. With reference to FIG. 1, an image pick-up apparatus 10 of this embodiment is, for example, a cell phone, a tablet computer, a notebook computer, a navigation apparatus, a driving recorder, a digital camera, a digital video camcorder (DVC), or any other electronic apparatus having image-capturing function. The image pick-up apparatus 10 includes a first fisheye lens 12, a second fisheye lens 14, a storage device 16, and a processor 18, and functions thereof are described as follows.

Each of the first fisheye lens 12 and the second fisheye lens 14 includes a lens and an image sensor. Fixed-focus lenses or variable-focus lenses with a view angle close to, equal to, or greater than 180 degrees are adopted for the lenses, such that, an object being captured within a field of view (FOV) of the lenses may be imaged on the image sensors. A charge coupled device (CCD), a complementary metal-oxide semiconductor (CMOS) device, or a photosensitive device of other types is disposed in the image sensor. Intensity of light entering into the lenses may thus be sensed, and an image signal is picked up to generate fisheye images. A baseline distance, for example, is provided between the first fisheye lens 12 and the second fisheye lens 14.

The storage device 16, for example, is a fixed or a movable random access memory (RAM) in any form, a read-only memory (ROM), a flash memory, any other similar device, or a combination of the foregoing devices. In this embodiment, the storage device 16 is configured to record an image capturing module 161, an object detection module 162, an azimuth angle calculation module 163, an incident angle calculation module 164, and a coordinate calculation module 165. The modules, for example, are stored in a program in the storage device 16.

The processor 18 may be, for example, a central processing unit (CPU), a programmable microprocessor for general or special use, a digital signal processor (DSP), a programmable controller, an application specific integrated circuit (ASIC), a programmable logic device (PLD), any other similar device, or a combination of the foregoing devices. The processor 18 is connected to the first fisheye lens 12, the second fisheye lens 14, and the storage device 16 and is configured for loading programs of the image capturing module 161, the object detection module 162, the azimuth angle calculation module 163, the incident angle calculation module 164, and the coordinate calculation module 165 from the storage device 16, so as to accordingly perform the method for calculating the coordinates of the object being captured by using the fisheye images in the embodiments of the invention.

Figure 2:
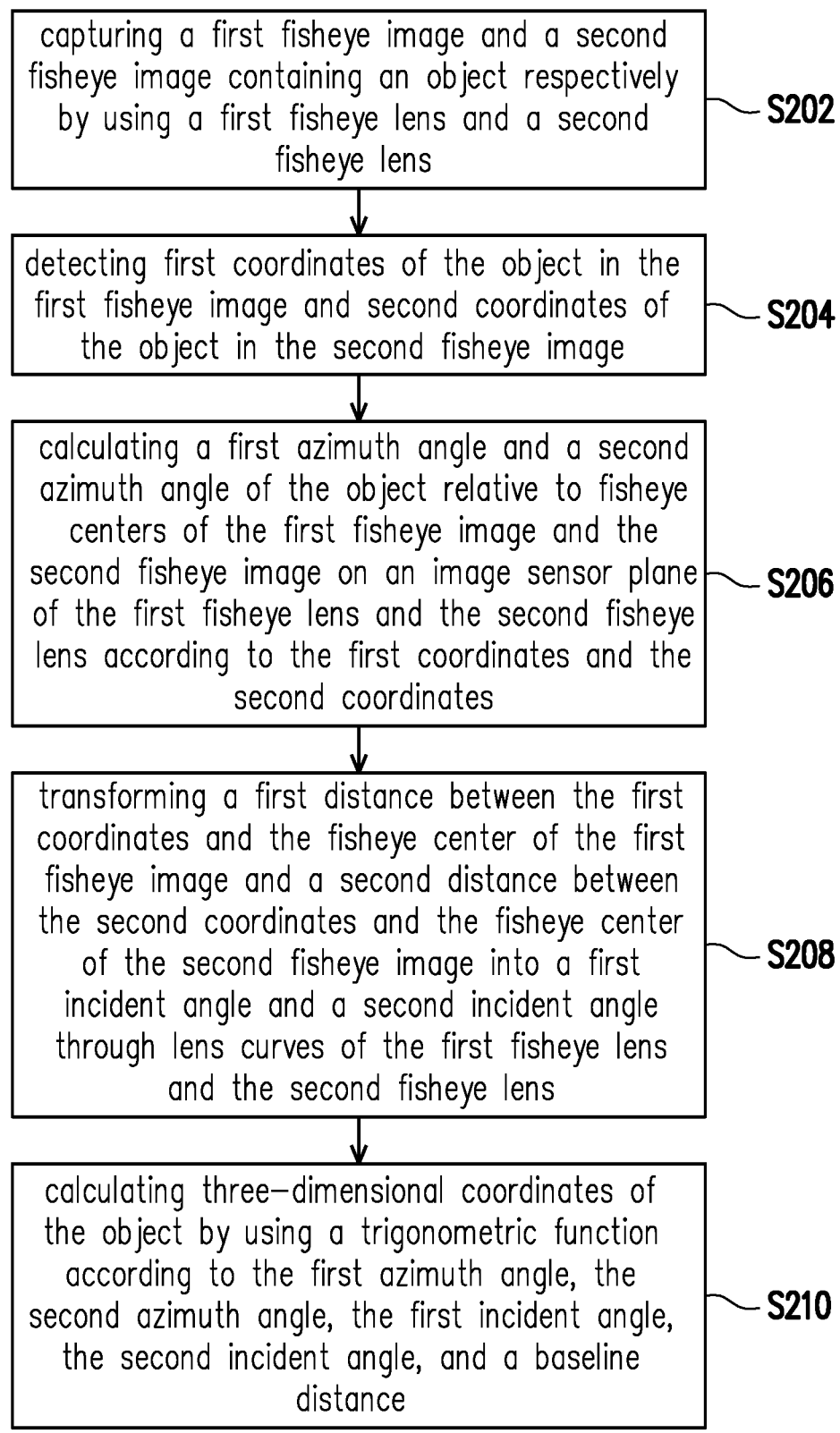
FIG. 2 illustrates a flowchart of an image capturing method of an image pick-up apparatus according to an embodiment of the invention.

To be specific, FIG. 2 illustrates a flowchart of a method for calculating coordinates of an object being captured by using fisheye images according to an embodiment of the invention. With reference to FIG. 1 and FIG. 2 together, the method of the embodiment is adapted for the image pick-up apparatus 10 of FIG. 1. Detailed steps of calculating the coordinates of the object being captured by using the fisheye images provided by the embodiments of the invention are described with reference to the elements in the image pick-up apparatus 10 as follows.

First, the processor 18 executes the image pick-up module 161 for capturing a first fisheye image and a second fisheye image containing an object respectively by using the first fisheye lens 12 and the second fisheye lens 12 (step S202). The object is, for example, a white, blue, red, or green light bulb or a light bulb emitting any other color which may be recognized easily. The light bulb is disposed on, for example, a joystick, a controller, a head-mounted display or a helmet for virtual reality use, or a wearable device such as a wristband or a watch. The image pick-up apparatus 10 may thus identify actions of a user hand-holding or wearing the object through the white light or any other color of light emitted by the light bulb.

Next, the processor 18 executes the object detection module 162 for detecting first coordinates of the object in the first fisheye image and second coordinates of the object in the second fisheye image (step S204). The object detection module 162, for example, detects a plurality of pixels having a brightness or a specific color component greater than a predetermined value in each of the first fisheye image and the second fisheye image. Coordinates of centers or centroids of regions formed by the pixels in the first fisheye image and in the second fisheye image act as the first coordinates and the second coordinates.

To be specific, if the object is the light bulb, the object in the fisheye images is presented as circular (or oval) regions having a greater brightness or a greater specific color component. In this way, the object detection module 162 may detect an object (the white light bulb) by comparing a brightness value of each of the pixels in the fisheye images with the predetermined value, or detect an object with a specific color (e.g., the blue light bulb) by comparing a pixel value of the specific color component (e.g., R, G, B) (e.g., a pixel value of a blue component) of each of the pixels in the fisheye images with the predetermined value. In another aspect, the object captured by the fisheye lens has different degrees of deformation (e.g., a circular light bulb is changed to an oval light bulb) according to a distance of the object deviating from the fisheye center. When the coordinates of the object in the fisheye images are determined, a center (e.g., a center of a smallest rectangle with an area covering the object) or a centroid of the object is calculated by the object detection module 162, for example, and coordinates of the centers or the centroids in the fisheye images are used as the coordinates of the object.

The processor 18 then executes the azimuth angle calculation module 163 to calculate a first azimuth angle and a second azimuth angle of the object relative to the fisheye centers of the first fisheye image and the second fisheye image on an image sensor plane of the first fisheye lens and the second fisheye lens according to the first coordinates and the second coordinates (step S206). In addition, the processor 18 further executes the incident angle calculation module 164 to transform a first distance between the first coordinates and the fisheye center of the first fisheye image and a second distance between the second coordinates and the fisheye center of the second fisheye image into a first incident angle and a second incident angle through lens curves of the first fisheye lens 12 and the second fisheye lens 14 (step S208). Herein, the processor 18 executes step S206 and step S208 in an order not limited to the above. The processor 18 may execute step S208 before executing step S206 or may execute the two steps simultaneously.

Projection radiuses of the object captured by the first fisheye lens 12 and the second fisheye lens 14 on the image sensor plane may vary according to the lens curves. In an embodiment, if equi-distance lenses are adopted for the first fisheye lens 12 and the second fisheye lens 14, the incident angles of light received by the fisheye lenses are approximately linear with the projection radiuses of the light on the image sensors. In this way, an incident angle of the light emitted by the object on the first fisheye lens 12 is proportional to the projection radius of the light projected on the image sensor of the first fisheye lens 12. On the other hand, an incident angle of the light emitted by the object on the second fisheye lens 14 is proportional to the projection radius of the light projected on the image sensor of the second fisheye lens 14. In another embodiment, a polynomial function may also be used to present the relationship of the incident angles of the light received by the first fisheye lens 12 and the second fisheye lens 14 and the projection radiuses of the light on the image sensors. Such relationship may be obtained in advance through obtaining the lens curves in advance or measuring the projection radiuses of incident lights of different angles on the image sensors in advance.

Figure 3A:
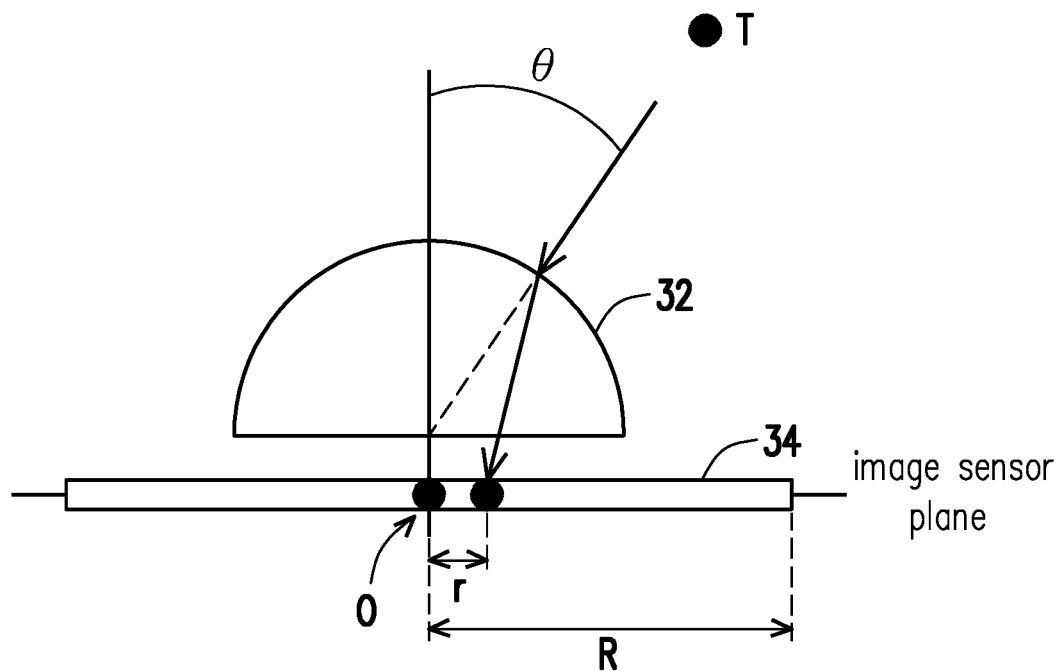
FIG. 3A to FIG. 3B illustrate examples of an image capturing method of an image pick-up apparatus 20 according to an embodiment of the invention.
Figure 3B:
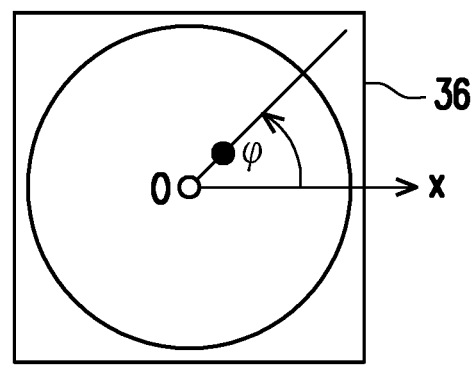

For instance, FIG. 3A illustrates a schematic diagram of a relationship of a projection radius of an object on a fisheye lens and an incident angle according to an embodiment of the invention, and FIG. 3B illustrates a schematic diagram of a relationship of a location of the object in a fisheye image and an azimuth angle according to an embodiment of the invention. With reference to FIG. 3A first, light emitted by an object T is, for example, incident on a fisheye lens 32 at an incident angle of θ, refracted by the fisheye lens 32, and imaged on a location on an image sensor plane on which an image sensor 34 is located at a distance of a projection radius r from a fisheye center O. Herein, an effective projection radius of the fisheye lens 32 on the image sensor plane is R. According to a lens curve of the fisheye lens 32, a relationship of the incident angle θ and the projection radius r is, for example, θ=k·r, wherein k is a constant and may be measured in advance. Accordingly, if the fisheye lens 32 is used to capture any object, the incident angle θ of light emitted by the object may thus be inversely derived through the foregoing relationship based on a location of the object in the fisheye image captured. In another aspect, with reference to FIG. 3B, an axis x penetrating through the fisheye center O of a fisheye image 36 may act as a basis, and an azimuth angle φ of an object T' relative to the fisheye center O may thus be calculated according to a location of the object T' in a fisheye image 36.

After the azimuth angle of the object relative to the fisheye center and an incident angle calculated through a distance between the object and the fisheye center, the processor 18 executes the coordinate calculation module 165, so as to calculate three-dimensional coordinates of the object by using a trigonometric function according to the first azimuth angle, the second azimuth angle, the first incident angle, the second incident angle, and the baseline distance (step S210).

Figure 4:
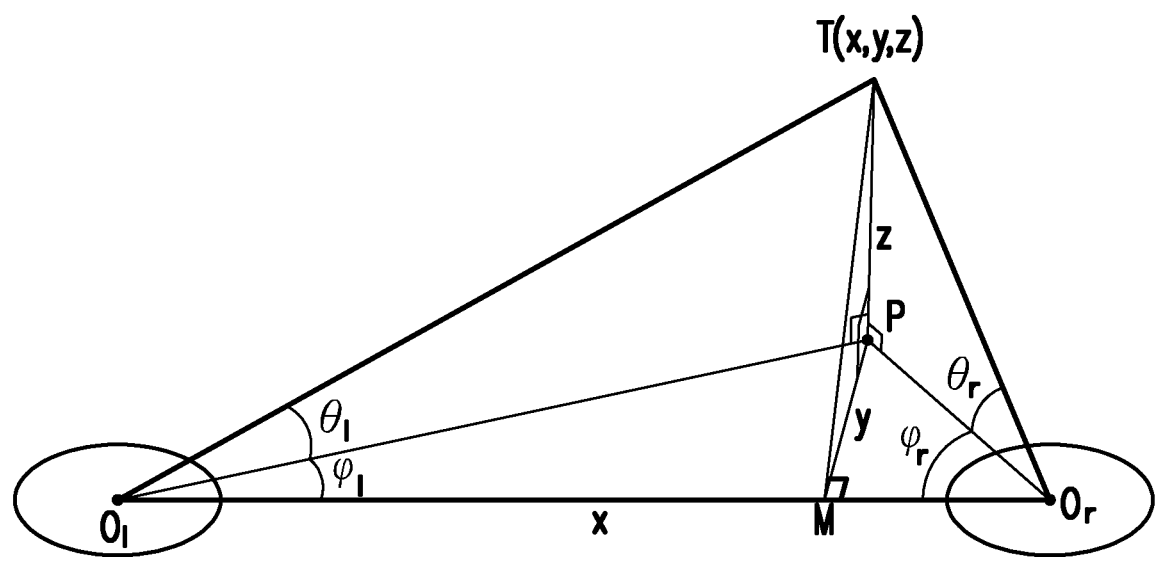
FIG. 4 illustrates a block view of an image pick-up apparatus according to an embodiment of the invention.

To be specific, FIG. 4 illustrates a schematic diagram of calculating three-dimensional coordinates of an object according to an embodiment of the invention. With reference to FIG. 4, it is assumed that $O_l$ and $O_r$ are the fisheye centers of the left and the right fisheye lenses, a point P is a projection point of the object T on a lens plane, and a length of a baseline $\overline{O_l O_r}$ is B. An included angle $\theta_l$ between a line segment $\overline{O_l T}$ and a line segment $\overline{O_l P}$ may be regarded as the incident angle of the light emitted from the object T incident on the left fisheye lens, and the line segment $\overline{O_l P}$ is a projection line of the line segment $\overline{O_l T}$ on the lens plane. An included angle $\varphi_l$ between the baseline $\overline{O_l O_r}$ and the projection line $\overline{O_l P}$ may be regarded as the azimuth angle of the object T relative to the fisheye center $O_l$. Similarly, an included angle $\theta_r$ between a line segment $\overline{O_r T}$ and a line segment $\overline{O_r P}$ may be regarded as the incident angle of the light emitted from the object T incident on the right fisheye lens, and the line segment $\overline{O_r P}$ is a projection line of the line segment $\overline{O_r T}$ on the lens plane. An included angle $\varphi_r$ between the baseline $\overline{O_l O_r}$ and the projection line $\overline{O_r P}$ may be regarded as the azimuth angle of the object T relative to the fisheye center $O_r$.

According to the azimuth angle $\varphi_l$, the azimuth angle $\varphi_r$, the incident angle $\theta_l$, the incident angle $\theta_r$, and the baseline distance B, the three-dimensional coordinates of the object T is (x, y, z) may be derived from the formulas as follows:

$$x = \overline{O_l M} = \frac{B \sin \varphi_l \cos \varphi_r}{\sin(\varphi_l + \varphi_r)};$$

$$y = \overline{MP} = \frac{B \sin \varphi_l \sin \varphi_r}{\sin(\varphi_l + \varphi_r)}; \text{ and}$$

$$z = \overline{PT} = \frac{B \cos \theta_l \sin \varphi_r}{\sin \theta_l \sin(\varphi_l + \varphi_r)} \text{ or } z = \frac{B \cos \theta_r \sin \varphi_l}{\sin \theta_r \sin(\varphi_l + \varphi_r)}.$$

Through the foregoing method, the image pick-up apparatus 10 of this embodiment may carry out calculation of the three-dimensional coordinates of the object being captured without performing fisheye calibration, and have a capturing range greater than that of conventional lenses.

Note that in the embodiment, optical axes of the two fisheye lenses of the image pick-up apparatus are parallel to each other by default. Nevertheless, in other embodiments, the optical axes of the two fisheye lenses are not required to be parallel to each other. That is, an included angle is provided between the optical axes of the two fisheye lenses. When the included angle increases, ranges covered by fields of view of the two fisheye lenses increase and an angle used to detect the location of the object increases as well.

The human eyes have a limited perception of depth, but have a better perception of objects located at the two sides. In an image pick-up apparatus of an embodiment of the invention, two fisheye lenses having non-parallel optical axes are adopted. As an included angle is provided between the two optical axes, an overlapping region and a non-overlapping region are included in the fields of view of the two fisheye lenses. When an object appears in the overlapping region, the image pick-up apparatus may calculate the three-dimensional coordinates of the object by using the trigonometric function according to the first azimuth angle, the second azimuth angle, the first incident angle, the second incident angle, and the baseline distance calculated in the foregoing embodiment. When an object appears in the non-overlapping region, the image pick-up apparatus may calculate two-dimensional coordinates of the object by using the trigonometric function according to the first azimuth angle, the second azimuth angle, the first incident angle, the second incident angle, and the baseline distance. Since the object located in the non-overlapping region is captured by only one fisheye lens, a depth of the object is unable to be calculated. Nevertheless, the two-dimensional coordinates of the object may still be calculated, the object located at an edge of the field of view is thus positioned.

Figure 5:
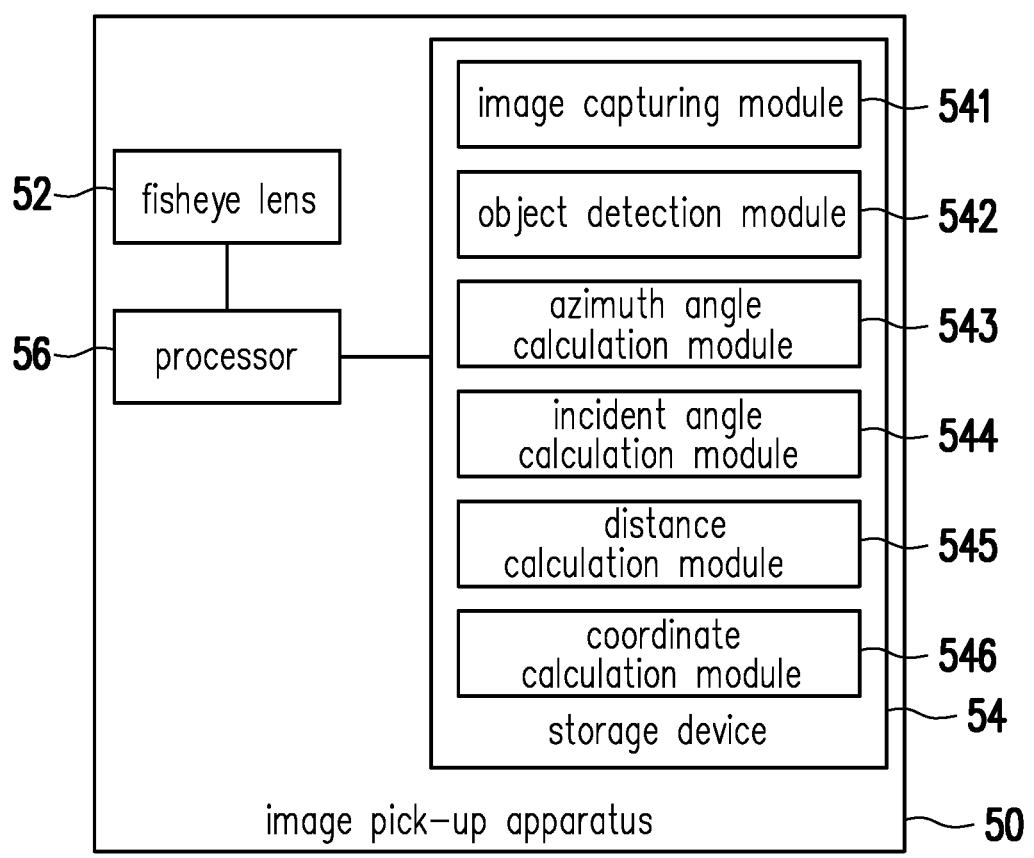
FIG. 5 illustrates a block view of an image pick-up apparatus according to an embodiment of the invention.

FIG. 5 illustrates a block view of an image pick-up apparatus according to an embodiment of the invention. With reference to FIG. 5, an image pick-up apparatus 50 of this embodiment is, for example, a cell phone, a tablet computer, a notebook computer, a navigation apparatus, a driving recorder, a digital camera, a digital video camcorder, or any other electronic apparatus having image-capturing function. The image pick-up apparatus 50 includes a fisheye lens 52, a storage device 54, and a processor 56. Functions of the fisheye lens 52 are identical or similar to the functions of the first fisheye lens 12 and the second fisheye lens 14 of the foregoing embodiment, and functions of the storage device 54 and the processor 56 are identical or similar to the functions of the storage device 16 and the processor 18 of the foregoing embodiment, and thus no further description is thus provided in detail herein.

Figure 6:
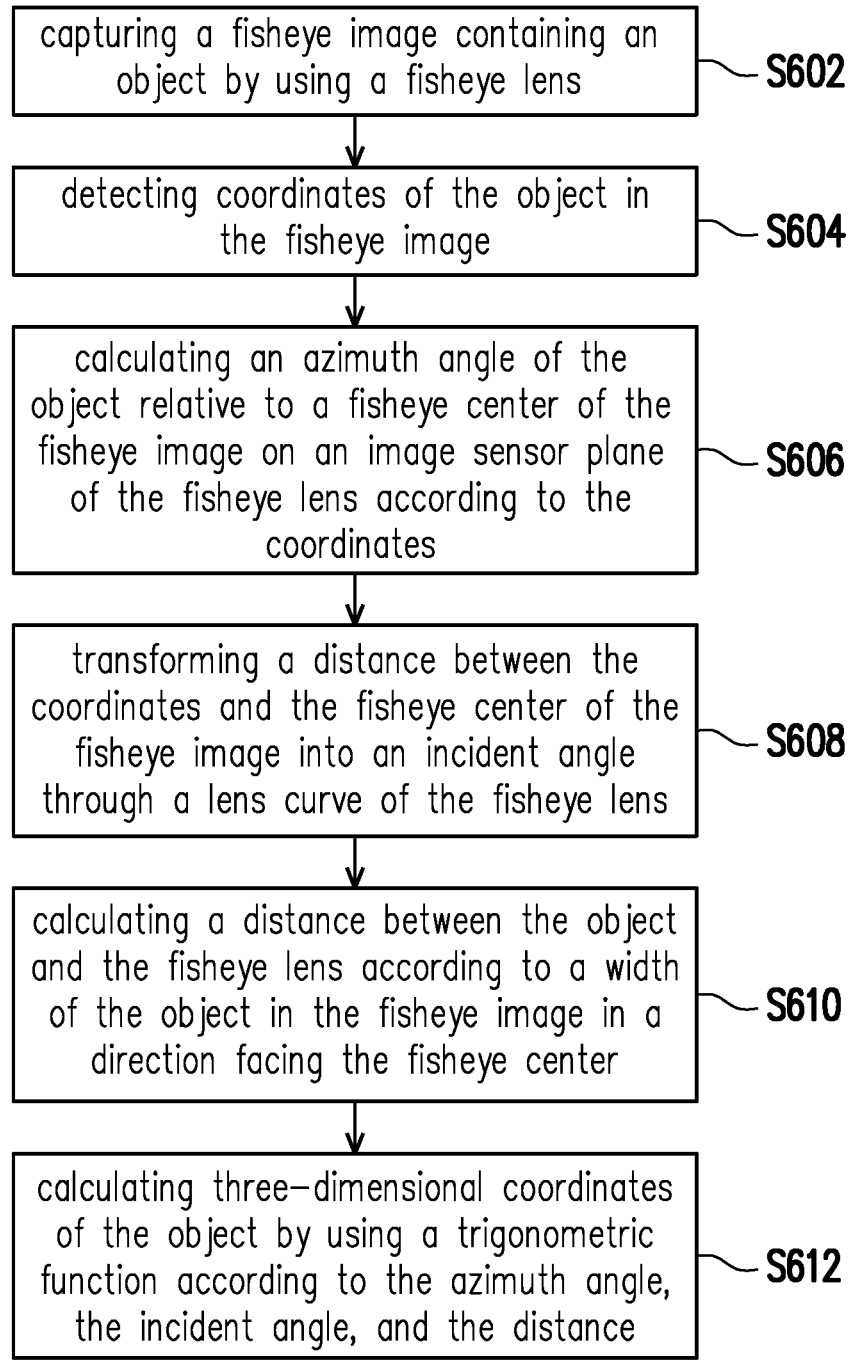
FIG. 6 illustrates a flowchart of an image capturing method of an image pick-up apparatus according to an embodiment of the invention.

FIG. 6 illustrates a flowchart of a method for calculating coordinates of an object being captured by using a fisheye image according to an embodiment of the invention. With reference to FIG. 5 and FIG. 6 together, the method of this embodiment is adapted for the image pick-up apparatus 50 of FIG. 5. Steps of the method of this embodiment for calculating the coordinates of the object being captured by the fisheye image are explained in detail below with reference to the components in the image pick-up apparatus 50.

First, the processor 56 executes an image pick-up module 541 for capturing a fisheye image containing an object by using the fisheye lens 52 (step S602). The object is, for example, a white, blue, red, or green light bulb or a light bulb emitting any other color which may be recognized easily. The light bulb is disposed on, for example, a joystick, a controller, a head-mounted display or a helmet for virtual reality use, or a wearable device such as a wristband or a watch. The image pick-up apparatus 50 may thus identify actions of a user hand-holding or wearing the object through the white light or any other color of light emitted by the light bulb.

Next, the processor 56 executes an object detection module 542 for detecting coordinates of the object in the fisheye image (step S604). The object detection module 542, for example, detects a plurality of pixels having a brightness or a specific color component greater than a predetermined value in the fisheye image. Coordinates of a center or a centroid of a region formed by the pixels in the fisheye image act as the coordinates.

To be specific, if the object is the light bulb, the object in the fisheye image is presented as a circular (or oval) region having a greater brightness or a greater specific color component. In this way, the object detection module 542 may detect an object (the white light bulb) by comparing a brightness value of each of the pixels in the fisheye image with the predetermined value, or detect an object with a specific color (e.g., the blue light bulb) by comparing a pixel value of the specific color component (e.g., R, G, B) (e.g., a pixel value of a blue component) of each of the pixels in the fisheye image with the predetermined value. In another aspect, the object captured by the fisheye lens has different degrees of deformation (e.g., a circular light bulb is changed to an oval light bulb) according to distances of the object deviating from the fisheye center. When the coordinates of the object in the fisheye image is determined, a center (e.g., a center of a smallest rectangle with an area covering the object) or a centroid of the object is calculated by the object detection module 542, for example, and coordinates of the center or the centroid in the fisheye image is used as the coordinates of the object.

The processor 56 than executes an azimuth angle calculation module 543 to calculate an azimuth angle of the object relative to a fisheye center of the fisheye image on an image sensor plane of the fisheye lens according to the coordinates (step S606). In addition, the processor 56 also executes an incident angle calculation module 544 to transform a distance between the coordinates and the fisheye center of the fisheye image into an incident angle through a lens curve of the fisheye lens 52 (step S608). Herein, the processor 56 executes step S606 and step S608 in an order not limited to the above. The processor 56 may execute step S608 before executing step S606 or may execute the two steps simultaneously.

A projection radius of the object captured by the fisheye lens 52 on the image sensor plane may vary according to the lens curve. In an embodiment, if an equi-distance lens is adopted for the fisheye lens 52, an incident angle of light received by the fisheye lens is approximately linear with a projection radius of the light on an image sensor. In this way, the incident angle of the light emitted by the object on the fisheye lens 52 is proportional to the projection radius of the light projected on the image sensor of the fisheye lens 52. In another embodiment, a polynomial function may also be used to present the relationship of the incident angle of the light received by the fisheye lens 52 and the projection radius of the light on the image sensor. Such relationship may be obtained in advance through obtaining the lens curve in advance or measuring the projection radius of incident lights of different angles on the image sensor in advance.

In addition, the processor 56 executes a distance calculation module 545 to calculate a distance between the object and the fisheye lens according to a width of the object in the fisheye image in a direction facing the fisheye center (step S610). To be specific, as described above, the object captured by the fisheye lens 52 has different degrees of deformation (e.g., a circular light bulb is changed to an oval light bulb) according to different distances of the captured object deviating from the fisheye center. The captured object may be subjected to greater degrees of deformation when the captured object is deviated farther away from the fisheye center. According to such characteristic, in the embodiments of the invention, a distance between the object and the fisheye lens 522 is calculated according to a width of the captured object after being deformed in the fisheye image.

Figure 7A:
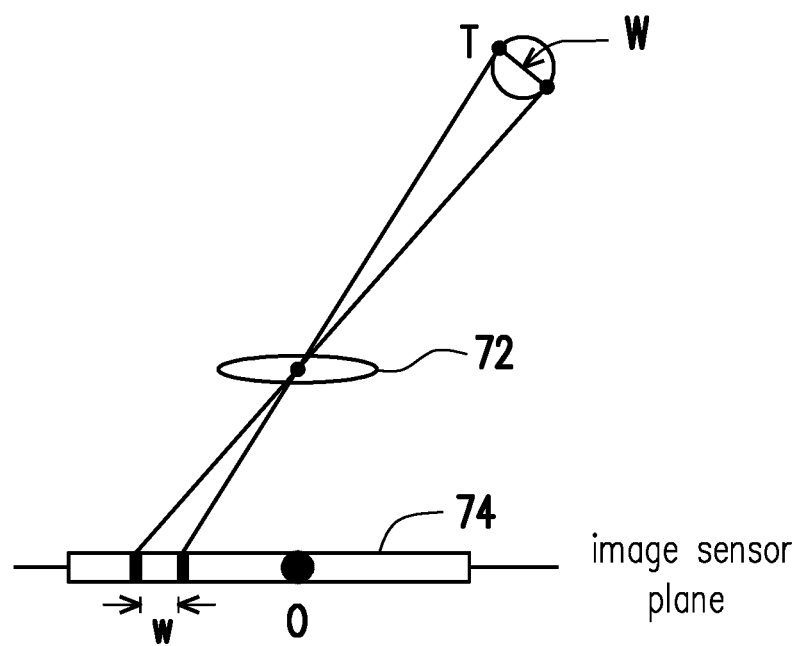
FIGS. 7A and 7B are examples illustrate imaging of a captured object through a fisheye lens according to an embodiment of the invention.
Figure 7B:
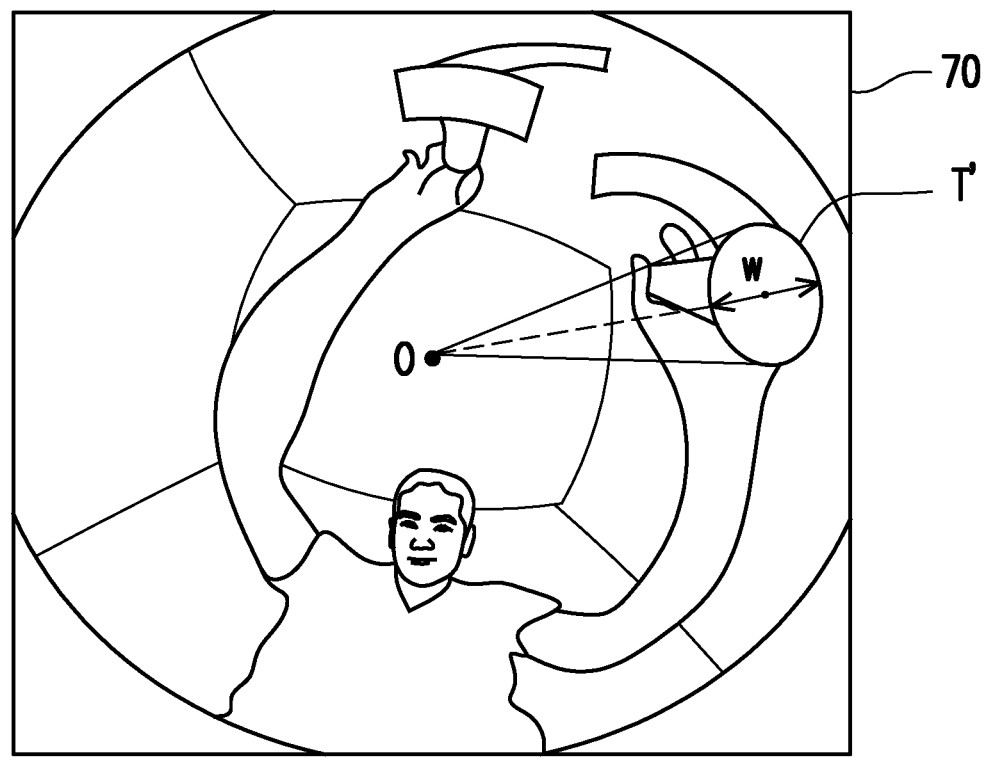

For instance, FIGS. 7A and 7B are examples illustrate imaging of a captured object through a fisheye lens according to an embodiment of the invention. With reference to FIG. 7A, the light emitted by the object T is imaged on an image sensor 74 after being refracted by a fisheye lens 72. Herein, it is assumed that an original width of the object T is W, and a width imaged on the image sensor 74 of the object T after being refracted by the fisheye lens 72 is changed to w. FIG. 7B illustrates a fisheye image 70 of the object T captured by the image sensor 74, wherein an object T' is an image of the object T projected on the image sensor 74. A characteristic of the fisheye lens 72 is that the object shows greater degrees of deformation when the object is deviated farther away from the fisheye center O, as such, the object T' is changed to be oval-shaped as shown in the drawing. Further, a distance between the object T and the fisheye lens 72 may be calculated according to the width w of the object T' in the fisheye image 70 in a direction facing the fisheye center O.

To be specific, in an embodiment, it is assumed that a width of the object in the fisheye image is $w_T$, an actual width of the object is $W_T$, an image width of the fisheye image is $W_I$, and a field of view (FOV) of the fisheye lens is F, and a distance r between the object and the fisheye lens is:

$$r = \frac{W_T}{w_T} \times \frac{W_I}{F} \times \frac{180}{\pi} \quad (1)$$

For instance, when the fisheye lens is used to capture the fisheye images of the object being placed in different distances, Table 1 lists relationships of the widths (pixels) of the object in the fisheye images and the distances. Herein, an object 1 is a light bulb with a diameter of 1 centimeter, an object 2 is a light bulb with a diameter of 5 centimeters, an image width of a fisheye image captured by a fisheye lens is 864 pixels, and a field of view of the fisheye lens is 187 degrees.

TABLE 1

| Distance (centimeter) | Object 1 Width (pixel) | Object 2 Width (pixel) |
| --- | --- | --- |
| 100 | 2.64724885 | 13.23624425 |
| 90 | 2.941387611 | 14.70693806 |
| 80 | 3.309061063 | 16.54530531 |
| 70 | 3.781784072 | 18.90892036 |
| 60 | 4.412081417 | 22.06040709 |
| 50 | 5.2944977 | 26.4724885 |
| 40 | 6.618122126 | 33.09061063 |

TABLE 1-continued

| Distance (centimeter) | Object 1 Width (pixel) | Object 2 Width (pixel) |
|---|---|---|
| 30 | 8.824162834 | 44.12081417 |
| 20 | 13.23624425 | 66.18122126 |
| 10 | 26.4724885 | 132.3624425 |
| 5 | 52.944977 | 264.724885 |

Taking the object 2 with the capturing distance of 100 centimeters as an example, the width of the object 2 in the fisheye image captured is 13.23624425 pixels. After the parameters are introduced in formula (1), a distance r between the object 2 and the fisheye lens is calculated as:

$$r = \frac{W_T}{w_T} \times \frac{W_I}{F} \times \frac{180}{\pi} = \frac{5}{13.23624425} \times \frac{864}{187} \times \frac{180}{\pi} = 100.00.$$

After an azimuth angle, an incident angle, and a distance from the fisheye lens of the object are calculated, the processor 56 executes a coordinate calculation module 546, so as to calculate three-dimensional coordinates of the object by using a trigonometric function according to the azimuth angle, the incident angle, and the distance (step S612).

Figure 8:
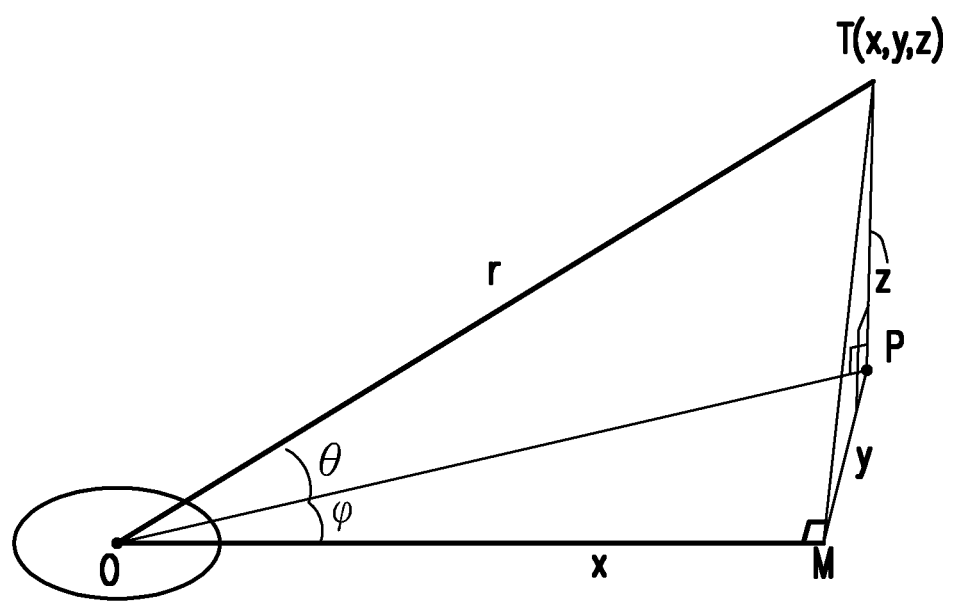
FIG. 8 illustrates a schematic diagram of calculating three-dimensional coordinates of an object according to an embodiment of the invention.

To be specific, FIG. 8 illustrates a schematic diagram of calculating three-dimensional coordinates of an object according to an embodiment of the invention. With reference to FIG. 8, it is assumed that O is the fisheye center of the fisheye lens, the point P is the projection point of the object T on the lens plane, and the distance between the object T and the fisheye center O is r. A line segment $\overline{OP}$ is a projection line of a line segment $\overline{OT}$ on the lens plane, and an included angle θ between a line segment $\overline{OT}$ and the line segment $\overline{OP}$ may be regarded as the incident angle of the light emitted from the object T incident on the fisheye lens. A line segment $\overline{OM}$ is a projection line of the line segment $\overline{OP}$ on a horizontal axis, and an included angle φ between the line segment $\overline{OM}$ and the line segment $\overline{OP}$ may be regarded as the azimuth angle of the object T relative to the fisheye center O.

According to the azimuth angle φ, the incident angle θ, and the distance r, the three-dimensional coordinates of the object T is (x, y, z) may be derived from the formulas as follows:

$$x = \overline{OM} = r \cos \theta \cos \varphi \quad (2)$$

$$y = \overline{PM} = r \cos \theta \sin \varphi \quad (3)$$

$$z = \overline{TP} = r \sin \theta \quad (4)$$

Through the foregoing method, the image pick-up apparatus 50 of this embodiment may carry out calculation of the three-dimensional coordinates of the object being captured without performing fisheye calibration, and have a capturing range greater than that of the conventional lenses.

In view of the foregoing, in the method and the image pick-up apparatus for calculating the coordinates of the object being captured by using the fisheye images, the incident angles of the light emitted by the object entering into the fisheye lenses and the azimuth angles of the object on the lens plane are calculated according to the locations of the object in the images captured by the fisheye lenses, and the three-dimensional coordinates of the object in the space are thus calculated. In another aspect, in the embodiments of the invention, the distances between the object and the fisheye lenses are calculated according to the widths of the object in the fisheye images. Finally, the three-dimensional coordinates of the object in the space are thereby calculated by using the trigonometric function. In this way, in the embodiments of the invention, the three-dimensional coordinates of the object being captured may be calculated without performing geometric conversion, and computation required to detect the object may be lowered while expanding the detection range.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for calculating coordinates of an object being captured by using fisheye images, adapted for an image pick-up apparatus having a first fisheye lens and a second fisheye lens, wherein a baseline distance is provided between the first fisheye lens and the second fisheye lens, and the method comprises:

capturing a first fisheye image and a second fisheye image containing an object respectively by using the first fisheye lens and the second fisheye lens;

detecting first coordinates of the object in the first fisheye image and second coordinates of the object in the second fisheye image;

calculating a first azimuth angle and a second azimuth angle of the object relative to fisheye centers of the first fisheye image and the second fisheye image on an image sensor plane of the first fisheye lens and the second fisheye lens according to the first coordinates and the second coordinates;

transforming a first distance between the first coordinates and the fisheye center of the first fisheye image and a second distance between the second coordinates and the fisheye center of the second fisheye image into a first incident angle and a second incident angle respectively through lens curves of the first fisheye lens and the second fisheye lens; and calculating three-dimensional coordinates of the object by using a trigonometric function according to the first azimuth angle, the second azimuth angle, the first incident angle, the second incident angle, and the baseline distance, wherein the first azimuth angle is $\varphi_l$, the second azimuth angle is $\varphi_r$, the first incident angle is $\theta_l$, the second incident angle is $\theta_r$, the baseline distance is B, and the three-dimensional coordinates of the object are (x, y, z), wherein $$x = \frac{B \sin \varphi_l \cos \varphi_r}{\sin(\varphi_l + \varphi_r)};$$

$$y = \frac{B \sin \varphi_l \sin \varphi_r}{\sin(\varphi_l + \varphi_r)}; \text{ and}$$

$$z = \frac{B \cos \theta_l \sin \varphi_r}{\sin \theta_l \sin(\varphi_l + \varphi_r)} \text{ or } z = \frac{B \cos \theta_r \sin \varphi_l}{\sin \theta_r \sin(\varphi_l + \varphi_r)}.$$

2. The method as claimed in claim 1, wherein the object comprises a light-emitting device, and the step of detecting the first coordinates and the second coordinates of the object in the first fisheye image and the second fisheye image comprises:

detecting a plurality of pixels having a brightness or a color component greater than a predetermined value in each of the first fisheye image and the second fisheye image, coordinates of centers or centroids of regions formed by the pixels in the first fisheye image and the second fisheye image acting as the first coordinates and the second coordinates.

3. The method as claimed in claim 2, wherein an incident angle of light emitted by the object on the first fisheye lens is proportional to a projection radius of the light projected on an image sensor of the first fisheye lens, and an incident angle of the light emitted by the object on the second fisheye lens is proportional to a projection radius of the light projected on an image sensor of the second fisheye lens.

4. The method as claimed in claim 1, wherein an included angle is provided between an optical axis of the first fisheye lens and an optical axis of the second fisheye lens and that a field of view of the first fisheye lens and a field of view of the second fisheye lens comprise an overlapping region and a non-overlapping region, wherein
the three-dimensional coordinates of the object are calculated by using the trigonometric function according to the first azimuth angle, the second azimuth angle, the first incident angle, the second incident angle, and the baseline distance when the object appears in the overlapping region; and
two-dimensional coordinates of the object are calculated by using the trigonometric function according to the first azimuth angle, the second azimuth angle, the first incident angle, the second incident angle, and the baseline distance when the object appears in the non-overlapping region.

5. An image pick-up apparatus, comprising:
a first fisheye lens;
a second fisheye lens, a baseline distance being provided between the first fisheye lens and the second fisheye lens;
a storage device, storing a plurality of modules;
a processor, coupled to the first fisheye lens, the second fisheye lens, and the storage device and accessing and executing the modules stored in the storage device, the modules comprising:
an image pick-up module, capturing a first fisheye image and a second fisheye image containing an object respectively by using the first fisheye lens and the second fisheye lens;
an object detection module, detecting first coordinates and second coordinates of the object in the first fisheye image and the second fisheye image;
an azimuth angle calculation module, calculating a first azimuth angle and a second azimuth angle of the object relative to fisheye centers of the first fisheye image and the second fisheye image on an image sensor plane of the first fisheye lens and the second fisheye lens according to the first coordinates and the second coordinates;
an incident angle calculation module, transforming a first distance between the first coordinates and the fisheye center of the first fisheye image and a second distance between the second coordinates and the fisheye center of the second fisheye image into a first incident angle and a second incident angle respectively through lens curves of the first fisheye lens and the second fisheye lens; and
a coordinate calculation module, calculating three-dimensional coordinates of the object by using a trigonometric function according to the first azimuth angle, the second azimuth angle, the first incident angle, the second incident angle, and the baseline distance,
wherein the first azimuth angle is $\varphi_l$, the second azimuth angle is $\varphi_r$, the first incident angle is $\theta_l$, the second incident angle is $\theta_r$, the baseline distance is B, and the three-dimensional coordinates of the object are (x, y, z), wherein $$x = \frac{B \sin \varphi_l \cos \varphi_r}{\sin(\varphi_l + \varphi_r)};$$

$$y = \frac{B \sin \varphi_l \sin \varphi_r}{\sin(\varphi_l + \varphi_r)}; \text{ and}$$

$$z = \frac{B \cos \theta_l \sin \varphi_r}{\sin \theta_l \sin(\varphi_l + \varphi_r)} \text{ or } z = \frac{B \cos \theta_r \sin \varphi_l}{\sin \theta_r \sin(\varphi_l + \varphi_r)}.$$

6. The image pick-up apparatus as claimed in claim 5, wherein the object comprises a light-emitting device, and the object detection module comprises a plurality of pixels having a brightness or a color component greater than a predetermined value in each of the first fisheye image and the second fisheye image, coordinates of centers or centroids of regions formed by the pixels in the first fisheye image and in the second fisheye image acting as the first coordinates and the second coordinates.

7. The image pick-up apparatus as claimed in claim 6, wherein an incident angle of light emitted by the object on the first fisheye lens is proportional to a projection radius of the light projected on the image sensor of the first fisheye lens, and an incident angle of light emitted by the object on the second fisheye lens is proportional to a projection radius of the light projected on an image sensor of the second fisheye lens.

8. The image pick-up apparatus as claimed in claim 5, wherein an included angle is provided between an optical axis of the first fisheye lens and an optical axis of the second fisheye lens such that a field of view of the first fisheye lens and a field of view of the second fisheye lens comprise an overlapping region and a non-overlapping region, wherein
the coordinate calculation module calculates the three-dimensional coordinates of the object by using the trigonometric function according to the first azimuth angle, the second azimuth angle, the first incident angle, the second incident angle, and the baseline distance when the object appears in the overlapping region; and
the coordinate calculation module calculates two-dimensional coordinates of the object by using the trigonometric function according to the first azimuth angle, the second azimuth angle, the first incident angle, the second incident angle, and the baseline distance when the object appears in the non-overlapping region.

9. A method for calculating coordinates of an object captured by using fisheye images, adapted for an image pick-up apparatus having a fisheye lens, the method comprising:
capturing a fisheye image containing an object by using the fisheye lens;
detecting coordinates of the object in the fisheye image;
calculating an azimuth angle of the object relative to a fisheye center of the fisheye image on an image sensor plane of the fisheye lens according to the coordinates;
transforming a distance between the coordinates and the fisheye center of the fisheye image into an incident angle through a lens curve of the fisheye lens;

calculating a distance between the object and the fisheye lens according to a width of the object in the fisheye image in a direction facing the fisheye center; and calculating three-dimensional coordinates of the object by using a trigonometric function according to the azimuth angle, the incident angle, and the distance, wherein the width of the object in the fisheye image is $w_T$, an actual width of the object is $W_T$, an image width of the fisheye image is $W_I$, and a field of view (FOV) of the fisheye lens is F, and a distance r between the object and the fisheye lens is:

$$r = \frac{W_T}{w_T} \times \frac{W_I}{F} \times \frac{180}{\pi}.$$

10. The method as claimed in claim 9, wherein the object comprises a light-emitting device, and the step of detecting the coordinates of the object in the fisheye image comprises:
detecting a plurality of pixels having a brightness or a color component greater than a predetermined value in the fisheye image, coordinates of a center or a centroid of a region formed by the pixels in the fisheye image acting as the coordinates.

11. The method as claimed in claim 10, wherein an incident angle of light emitted by the object on the fisheye lens is proportional to a projection radius of the light projected on an image sensor of the fisheye lens.

12. The method as claimed in claim 9, wherein the azimuth angle is φ, the incident angle is θ, the distance is r, and the three-dimensional coordinates of the object are (x, y, z), wherein $x = r \cos θ \cos φ$;

$y = r \cos θ \sin φ$; and $z = r \sin θ$.

13. An image pick-up apparatus, comprising:
a fisheye lens;
a storage device, storing a plurality of modules;
a processor, coupled to the fisheye lens and the storage device and accessing and executing the modules stored in the storage device, the modules comprising:
an image pick-up module, capturing an image containing an object by using the fisheye lens;
an object detection module, detecting coordinates of the object in the fisheye image;
an azimuth angle calculation module, calculating an azimuth angle of the object relative to a fisheye center of the fisheye image on an image sensor plane of the fisheye lens according to the coordinates;
an incident angle calculation module, transforming a distance between the coordinates and the fisheye center of the fisheye image into an incident angle through a lens curve of the fisheye lens;
a distance calculation module, calculating a distance between the object and the fisheye lens according to a width of the object in the fisheye image in a direction facing the fisheye center; and
a coordinate calculation module, calculating three-dimensional coordinates of the object by using a trigonometric function according to the azimuth angle, the incident angle, and the distance, wherein the width of the object in the fisheye image is $w_T$, an actual width of the object is $W_T$, an image width of the fisheye image is $W_I$, a field of view (FOV) of the fisheye lens is F, and a distance r between the object and the fisheye lens is:

$$r = \frac{W_T}{w_T} \times \frac{W_I}{F} \times \frac{180}{\pi}.$$

14. The image pick-up apparatus as claimed in claim 13, wherein the object comprises a light-emitting device, the object detection module comprises detecting a plurality of pixels having a brightness or a color component greater than a predetermined value in the fisheye image, and coordinates of a center or a centroid of a region formed by the pixels in the fisheye image act as the coordinates.

15. The image pick-up apparatus as claimed in claim 14, wherein an incident angle of light emitted by the object on the fisheye lens is proportional to a projection radius of the light projected on an image sensor of the fisheye lens.

16. The image pick-up apparatus as claimed in claim 13, wherein the azimuth angle is φ, the incident angle is θ, the distance is r, and the three-dimensional coordinates of the object are (x, y, z), wherein $x = r \cos θ \cos φ$;

$y = r \cos θ \sin φ$; and $z = r \sin θ$.

* * * * *